United States Patent
Gilmore

[15] 3,695,802
[45] Oct. 3, 1972

[54] CUTTER AND VALVE DISC FOR RECIPROCATING DOUGHNUT AND CRULLER FORMERS

[72] Inventor: Chace D. Gilmore, 1224 Pottstown Pike, West Chester, Pa. 19380

[22] Filed: Oct. 16, 1970

[21] Appl. No.: 81,298

[52] U.S. Cl. .............................................. 425/287
[51] Int. Cl. ........................ A21c 3/04, A21c 11/16
[58] Field of Search .............. 107/14 E, 14 R, 1 R, 1;
425/287, 288, 381; 401/140, 191, 171;
425/87

[56] References Cited

UNITED STATES PATENTS 3,052,193   9/1962   Gilmore .................. 107/14 E
2,292,661   8/1942   Rush ....................... 107/14 E Primary Examiner—Jordan Franklin
Assistant Examiner—G. V. Larkin
Attorney—Mortenson & Weigel

[57] ABSTRACT

A thin, relatively flat cylindrical disc for use with a reciprocating doughnut cutter sleeve is formed to have ridged, radially extending protuberances forming flutes on the upper surface of the disc so as to stroke the dough as it is being extruded to form the raw dough ring thereby creasing the dough formation without breaking its skin formation. This insures uniform cooking of the dough mass around the hole in the cooked dough. The fluted disc is formed of stiffly flexible material preferably having a relatively low heat conductivity. To increase the axial stiffness of the flexible disc and to enhance clean cuts of the dough, an outwardly flared, downwardly extending peripheral flange is formed at the tips of the protuberances. This aids in the positioning of the disc and in effecting a seal between the disc and the reciprocating sleeve and insures that the dough is cut off cleanly. The axial peripheral flexibility of the disc enables the disc, as it flexes slightly during operation, to dislodge particles of dough that tend to adhere to its upper surface thereby enhancing the operation of the disc. Secondly, by forming the disc of a material having a low heat conductivity there is less tendency for the dough on the upper surface of the disc to become heat dried and stuck to the disc which events degrade its proper operation.

5 Claims, 3 Drawing Figures

PATENTED OCT 3 1972          3,695,802

INVENTOR
Chace D. Gilmore
BY Mortenson and Weigel
ATTORNEYS

CUTTER AND VALVE DISC FOR RECIPROCATING DOUGHNUT AND CRULLER FORMERS

BACKGROUND OF THE INVENTION

The present invention relates to dough formers of the reciprocating type and more particularly to a cutting disc particularly adopted for use with such reciprocating type dough formers.

This application is an improvement over my U.S. Pat. No. 3,052,193 issued Sept. 4, 1962. As described in the said patent, a cutting disc for use with reciprocating formers provides a dough rubbing or stroking action capable of shaping and creasing the lower surface of the raw dough ring so that it bakes as quickly and evenly around its axial hole as around its outer periphery. This rubbing and/or stroking action controls the distribution of the dough in the raw dough ring so as to insure uniform expansion and even cooking immediately adjacent the hole. Better guidance is assured for the expansion of the uncooked dough to form a regular pattern on the finished pattern, which is not only desirable but indicates even expansion and even cooking throughout the dough ring to the eye of the purchaser. Such more even cooking and expansion permits the utilization of less dough with a resultant saving in the overall cost of making doughnuts.

While this patented cutting disc has proven very successful commercially, having found wide use in the industry, it does have certain disadvantages. In the embodiment wherein a resilient covering is bonded to a steel base disc to form the radial protuberances necessary to provide the stroking action, there is always the danger that, with use, some of the bonded material can wear down and break loose from the metal disc. This can create an unwanted receptacle in which dough can collect and provides a chamber for the incubation of bacteria. When the entire disc is made of metal this causes undue wear on the cutter sleeve such that with extended usage the cutter sleeve tends to become bell mouthed. In order to achieve the cutting action desired, the sleeve must be clean and sharp so that the doughnut does not tend to hang on one side and drop sideways into the shortening. If a sideways drop occurs, the resulting doughnut or cruller tends to become oval shaped. Even when the metal disc is new it does not always fit properly in the cutting sleeve and permits a certain amount of dough leakage. Excessive dough leakage can cause an eventual "break down of the shortening."

An additional disadvantage of the dough's of the metal disc is that it readily transfers heat from the hot shortening to the dough prior to its extrusion. This caused the dough to dry out, particularly on the upper surface of the disc, and prevents the doughs even flow over the protuberances. This degrades the stroking action and in the extreme the dough former tends to become hopelessly clogged. This heat transfer problem is particularly bothersome during coffee breaks during which time the machine may be shut down for an extended period of time during which the drying and hardening of the dough occurs.

It is, therefore, an object of this invention to obviated disadvantages of the prior art doughnut cutter discs.

Another object of this invention is to provide an improved doughnut cutter disc that is relatively simple and economical to produce.

BRIEF DESCRIPTION OF THE INVENTION

In one embodiment of this invention, a fluted cutting disc for making doughnuts and crullers with formers of the reciprocating cutter sleeve type, includes a substantially flat disc of cylindrical shape having a relatively large diameter as compared to its thickness. The disc is provided with an axial bore for receiving a mounting stem, said disc having a series of circumferentially spaced, integrally formed, raised protuberances defining radially extending flutes on its top surface area, said protuberances extending radially and being of substantial length as compared to their height, each of said protuberances being capable of streaking and creasing a dough formation being severed without breaking its skin formation to insure uniform cooking of the dough mass around the hole in the cooked doughnut or cruller, said disc and protuberances being integrally formed and capable of stiff axial, peripheral flexure whereby particles tending to adhere to the top surface area of the disc during operation become dislodged by the random flexure of said disc.

In the preferred embodiment the disc has a downwardly extending outwardly flared, peripheral axial flange, thereby to stiffen the peripheral portions of the disc and to provide a better seal during the movement of the disc within the cutting sleeve. The disc, in its peripheral regions contiguous to said flange, is formed to be relatively thin, having a constant thickness which is small compared to the thickness of the remainder of the disc to facilitate such flexure. The outward flare of the flanged portion permits the disc to tightly engage the inner wall of the cutting sleeve to prevent dough leakage and yet the upper portion of the disc itself may have a diameter slightly less than the inner diameter of the cutting sleeve. Thus the upper portion of the disc functions as a pilot or guide for the flange which does the actual dough cutting. Finally, the disc is formed of a material having a relatively low heat conductivity thereby to better insulate the top surface area of the disc from heat acting upon the lower disc surface whereby the dough has less tendency to dry out and stick on the top surface areas.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings, in which:

DETAILED DESCRIPTION OF THE INVENTION

Figure 1:
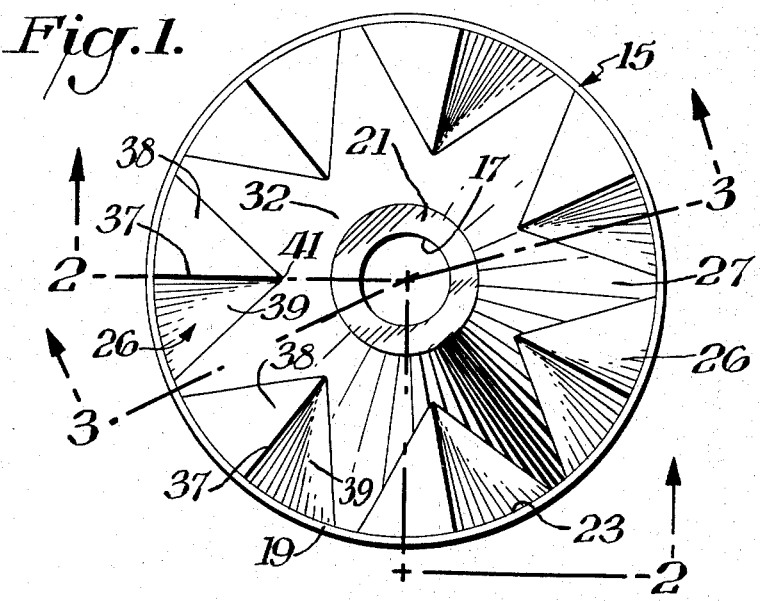
FIG. 1 is a top plan view of a flexible cutting disc embodying the principles of my invention.
Figure 2:
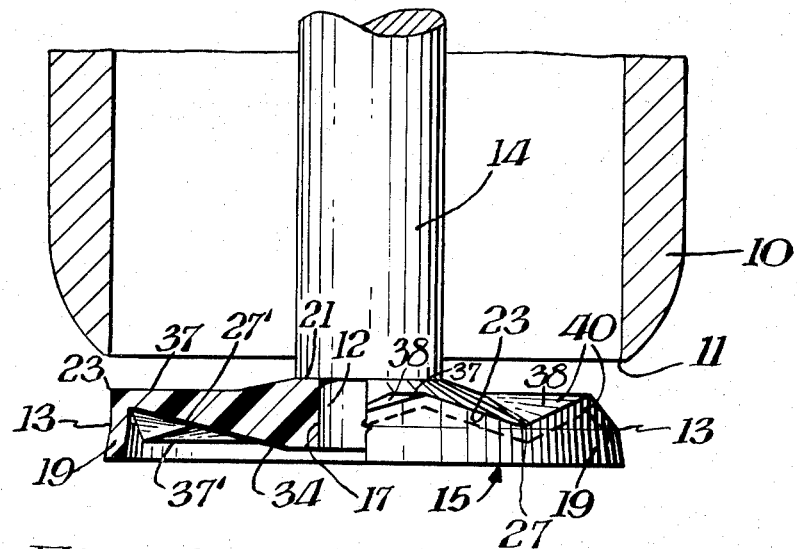
FIG. 2 is a side elevation view partially in cross-section of the cutting disc shown in FIG. 1, the cross-section being taken along the section line 2—2 of FIG. 1 and the disc being shown in relationship to the reciprocating sleeve.
Figure 3:
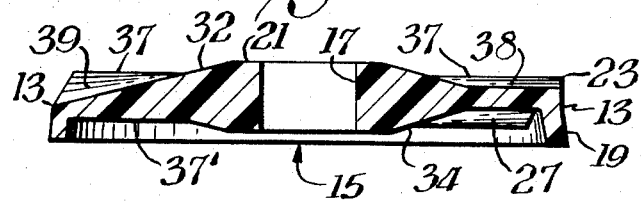
FIG. 3 is a side elevation view of the cutting disc shown in FIG. 1 taken along the section line 3—3 of FIG. 1.

In FIGS. 1, 2 and 3 there is illustrated a flexible fluted cutting disc 15 of the type capable of use with a typical reciprocal, tubular cutting sleeve 10 (shown in FIG. 2). The disc 15 is of cylindrical shape and is substantially flat but for a downwardly extending, thin, outwardly flared peripheral flange 19 which serves, as will be described hereinafter, to stiffen the axial flexure of the disc and to insure a clean cutoff of the dough. The disc 15 has a relatively large diameter as compared to its thickness and has a bore 17 extending axially therethrough which is adapted to slide over the lower reduced free threaded end 12 of the depending stem 14 of a conventional cutter. A nut (not shown) is screw threaded over the threaded end to secure the disc 15 against a shoulder formed on the stem 14 by its reduced threaded end whereby the disc is tightly secured to the stem 14.

The disc 15, itself, may be made from any suitable stiffly flexible material such as stainless steel, but is preferably made from a suitable plastic having a low heat conductivity such as a polyamide sold commercially under the trade name "nylon" or polytetrafluoroethylene sold commercially under the trade name "TEFLON" or any suitable material which is relatively non-toxic, is suitable for use with foods and yet is stiffly flexible. The upper peripheral edge 23 of the cutting disc preforms a guiding function for the disc within the sleeve and for that purpose the upper portion of the disc is formed to have a diameter slightly less than the inner diameter of the cutting sleeve 10. This facilitates the use of the disc with most cutting sleeves even though their tolerances may vary slightly. During operation, the reduced diameter permits the disc to readily accommodate itself within the cutting sleeve without damage to the sleeve or disc and the disc is centered therein. The outward flare of the flange 19 begins at approximately the line 12 which coincides roughly with the flutes 27 of the disc as will be described hereinafter.

The edge 23 is the terminus of a series of alternately spaced, annularly disposed peripheral ribs 26 and flutes or grooves 27. The upper or top surface area of the disc 15 is somewhat dome shaped and it slopes or tapers downwardly and outwardly from the top and flat plane area 21 and the bottom surface area of the disc 15 taper upwardly and inwardly as indicated at 34 such that the central portion of the disc tends to be symmetrical about the plane of the disc.

Each of the peripheral ribs 26 and flutes 27 form on the upper dome shaped surface 32 of the disc 15 a series of spaced protuberances of generally triangular shape having ridges 37 extending radially inwardly from the outer perimeter thereof. It should be noted that the top limits of the protuberances generally lie within the limits of the top plane surface 21 of the disc 15. Each ridge 37 has oppositely sloping sides 38 and 39. The base of each protuberance is generally arcuate and in substantial alignment with the upper peripheral edge 23 of the disc 15. The lower edges of the sides 38 and 39 of each ridge converse at a point 41 spaced from said plane surface area 21, thereby forming a flute 27 between adjacent ridges 37. It will be noted that the sides 38 and 39 of each ridge 37 converge inwardly, thereby forming flutes 27 that converge outwardly.

The peripheral flange 19 has an upper portion which is of substantially constant diameter and an outwardly flared lower portion. Both sections preferably are of constant and equal thickness. The diameter of the disc at the lower edge of the flange exceeds slightly that of the sleeve inner diameter such that the flanged portion 19 provides a sealing contact with the lower cutting edge 11 of the conventional reciprocating cutting sleeve 10 thereby providing a sealing and shearing contact with the sleeve 10 and a wiping action against the inner surface of the sleeve. The upper portion of the disc is thus seen to function as a pilot or guide to the flanged or cutting portion of the disc.

The lower surface area of the disc 15 is a substantial mirror image of the upper surface area but with the ridges 37' of the lower surface area spaced between or bisecting the ridges 37 of the upper surface area. Conversely the flutes or grooves 27' of the lower surface area are immediately below the ridges 37. The flutes 27' of the lower surface area define the protuberance 26 of the surface area and the protuberances 26' of the lower surface area define the flutes 27 of the upper surface area such that the two surface areas are complementary to each other at the periphery. Thus, as may be seen from FIGS. 1 and 2 of the drawings, the protuberances on the upper surface of the disc 15 are displaced from the protuberances on the lower surface of the disc 15 (corresponding to the flutes 27 of the upper surface) by $\pi$ radians divided by the number of protuberances in either the upper or lower surface of the disc 15. Stated in another manner, the lower surface of the disc 15 is substantially a mirror image of the upper surface of the disc 15 rotated $\pi$ radians divided by the number of protuberances in either the upper or lower surface. In the illustration of FIG. 1, there being seven protuberances, the upper and lower surfaces are rotated 25.71°. The construction permits the outer peripheral portion 40 of the disc 15 to have a uniform thickness that is thin compared to the overall thickness of the disc. The thin peripheral portion 40 thus enhances the axial flexure of the disc during operation with the resulting advantages as will be described.

This small thickness of the protuberances permits the entire outer annular portion of the disc forming the protuberances to be capable of flexure during the reciprocating operation of the cutting sleeve. This flexure facilitates the removal of dough or other particles which tend to preclude the free sliding action of the dough across the upper surface of the cutting disc. Such hard dough or other particles tend to form on the top surface of the disc during operation particularly in those cases where the disc is made of metal or other good heat conducting material. This problem is particularly pronounced when the operation of the machine is stopped, such as occurs during coffee breaks. During such periods the heat from the shortening below the disc is conducted up through the disc and causes the dough to become dried. The dried dough thus inhibits the proper operation of the protuberances and causes non-uniform doughnuts or crullers to be formed. As this condition becomes too severe the entire machine must be stopped and the entire cutter cleaned. The flexure provided by this invention provides in effect a self-cleaning action to the top of the disc.

In a preferred form of the invention the disc itself, to further prevent the heat transfer from occuring in the first place, is formed of a plastic or other material of the type having a low heat conductivity. With reduced heat transfer, the dough has less tendency to dry out and stick to the upper surface of the disc.

The flexure plus the low heat conductivity taken together with the peripheral, downwardly and tapered outwardly extending flange which provides an excellent seal renders a low cost cutting disc that is relatively quick and simple to construct. A simple injection molding operation is quite adequate to form the discs in quantity. The disc provides many advantages and obviates many of the problems encountered with the prior art doughnut cutting discs. The flange 19 may be omitted but is preferred for its flexure stiffening and sealing effect. In the event the flange is omitted, the diameter of the disc itself must be increased to tightly engage the inner wall of the cutting sleeve.

In alternative embodiments of the invention the disc may have relatively flat bottom, the number of protuberances may vary and the flare angle of the flange may vary. Typically, the flare angle is on the order of 10° from the vertical, but may vary from 0° to 30° and more. Also, actual ridges 37 need not be formed, rather the protuberances may have a curved upper surface if desired, although the ridged surface is preferred.

It is obvious that many embodiments may be made of this inventive concept and that many modifications may be made in the embodiments hereinbefore described. Therefore, it is to be understood that all descriptive matter herein is to be interpreted merely as illustrative, exemplary, and not in a limited sense. It is intended that various modifications which might readily suggest themselves to those skilled in the art be covered, as far as the prior art permits.

What is claimed is:

1. In apparatus for making doughnuts with formers having a reciprocatory cutting disc and a cutter sleeve that cooperates with said cutting disc, said disc being substantially flat, of cylindrical shape, having top and bottom surfaces and a relatively large diameter as compared to its thickness, and being provided with an axial bore for receiving a mounting stem, the improvement wherein:
    said disc is formed of a flexible material,
    the outer peripheral portions of said disc define alternate radially extending flutes and protuberances on both the top and bottom surfaces of said disc, and
    said disc has a radially decreasing thickness taper whereby its peripheral portions are capable of stiff axial flexure and particles of dough material are dislodged from the top surface of said disc during operation by its random flexure.

2. An apparatus according to claim 1 wherein said disc has a diameter less than the internal diameter of said sleeve and a downwardly extending, outwardly flared, peripheral coaxial flange adapted to slide axially within said cutter sleeve and provide a sealing and shearing contact with the inner surface of said cutter sleeve, whereby said disc functions to pilot said flange into said sleeve to sever said dough material.

3. An apparatus according to claim 1 wherein the periphery of said disc has a substantially constant axial dimension which is small compared to the thickness of said disc, thereby facilitating its peripheral flexure to aid in the self-cleaning of the disc.

4. An apparatus according to claim 3 wherein said disc has a downwardly extending, outwardly flared, peripheral coaxial flange adapted to slide axially within said cutter sleeve and provide a sealing and shearing contact with the inner surface of said cutter sleeve, whereby said disc functions to pilot said flange into said sleeve to sever said dough material.

5. An apparatus according to claim 1 wherein the lower surface of said disc is substantially a mirror image of said upper surface rotated $\pi$ radians divided by the number of said protuberances in either of said surfaces, thereby to enhance said peripheral flexure.

* * * * *